Patented Aug. 28, 1945

2,383,839

UNITED STATES PATENT OFFICE 2,383,839

CURED POLYMER MIXTURE

Nathan S. Beekley, Jr., Westfield, N. J., assignor, by mesne assignments, to Jasco, Incorporated, a corporation of Louisiana No Drawing. Application June 15, 1940,
Serial No. 340,778

8 Claims. (Cl. 260—42)

This invention relates to elastic, plastic, high strength compositions of matter, relates particularly to synthetic, curable polymer substances; and relates especially to curable compositions of isoolefin-diolefin polymers compounded with other synthetic polymers such as polyethylene and interpolymers of ethylene.

It has been found possible by a low temperature technique to produce polymers or copolymers or interpolymers of mixed olefins such as polymers from mixtures of an isoolefin such as isobutylene with a diolefin such as butadiene, isoprene or other conjugated diolefins. The procedure consists in cooling the mixed olefins to a low temperature ranging from $-10°$ C. to $-100°$ C. or lower and treating the cooled mixture with a catalyst such as aluminum chloride dissolved in an inert solvent such as an alkyl halide or carbon disulfide. The resulting interpolymer has a low degree of unsaturation, but is reactive with sulfur in spite of the low unsaturation, being thereby sharply differentiated from rubber with its high unsaturation and from the simple polymers such as polyisobutylene, polyethylene and similar polymers which in turn do not react with sulfur. The reaction of sulfur with such interpolymers as described above to produce a cure is easily conducted, especially in the presence of an organic sulfide such as tetramethyl thiuram disulfide which serves as a sulfurization aid. The cure then produces a material which may have a tensile strength ranging from 2500 pounds per square inch to 4500 pounds per square inch and an elongation ranging from 900% to 1200%.

These materials are, however, slightly tacky, even when cured, and for some purposes this is undesirable. Also the material swells in some organic solvents and particularly in the aliphatic hydrocarbon solvents, which property is also undesirable for some uses. It is now found that these interpolymers of an iso-olefin and a diolefin may have their properties modified in a very favorable manner by admixture with ethylene containing polymers. The number of substances which are compatible with these iso-olefin-diolefin interpolymers is relatively very small, since most substances behave merely like inert fillers. However, polyethylene in its various forms, both the simple polyethylene and the interpolymers of ethylene with various other polymerizable substances are compatible with the iso-olefin-diolefin polymers to modify and improve the physical and chemical properties. In spite of the fact that the ethylene polymers do not react with sulfur, the mixture of the iso-olefin-diolefin polymers with ethylene polymers cures readily with sulfur to yield material having a tensile strength substantially as high as the tensile strength of the iso-olefin-diolefin polymer when cured with sulfur alone. The presence of the ethylene polymer, not only improves the physical properties of the mixture in many ways, but in spite of its non-reactivity with sulfur, it does not interfere with the curing reaction of the iso-olefin-diolefin polymer. Furthermore, the cured mixture is free from tackiness and instead has a slightly waxy surface and in addition the swellability in solvents is markedly reduced. Thus the mixture retains the strength of the original curable polymer when admixed with substantial proportions of uncurable ethylene polymer and the tackiness and swellability are both greatly reduced.

Thus an object of the invention is to mix a curable polymer such as an interpolymer of isobutylene and a diolefin with an uncurable polymer such as polyethylene and its interpolymers and cure the mixture to reduce the surface tackiness, to increase solvent resistance, and to maintain in the mixture a high tensile strength, a high elasticity and a high abrasion and flexure resistance, both with and without compounding pigments. Other objects and details of the invention will be apparent from the following description.

In practicing the invention the interpolymer of the iso-olefin and diolefin is desirably prepared by a low temperature technique, which may in some instances be varied advantageously according to the amount and character of the compounding polymer. As a first step, a mixture of an iso-olefin such as isobutylene in the proportion of 60 to 99 parts with a diolefin such as butadiene or isoprene or dimethylbutadiene or pentadiene in the ratio of 40 to 1 parts is prepared and mixed with a diluent-refrigerant such as liquid ethylene or propane or other inert, low freezing liquid in the proportion of from 100 to 500 parts, or with a diluent such as ethyl or methyl chloride in the proportion of 50 to 300 parts together with a refrigerant such as solid carbon dioxide in excess. The liquid ethylene maintains a temperature in the mixture of approximately $-98°$ C. The solid carbon dioxide in excess maintains a temperature of approximately $-78°$ C. The mixture is then polymerized by the addition to the surface of the rapidly stirred mixture of a spray of a solution of aluminum chloride in an alkyl halide such as ethyl or methyl chloride, or in carbon disulfide. The polymerization proceeds rapidly to produce the desired polymer which has a molecular weight ranging from 15,000 to 150,000 or higher, and an iodine number ranging from 1 to 40 or 50, the preferable range being from 4 to 9, although the preferred range may vary according to the amount and character of the second polymer to be admixed. When the polymerization has proceeded to the desired stage, the reaction is desirably quenched by the addition of an oxygenated compound such as an alcohol or a ketone or an alkali such as ammonia or a substituted ammonia or an alkali metal hydroxide. The polymer is then removed and brought up to room temperature, after which it is washed on the mill with water to remove traces of the quenched catalyst and its cleavage products. The polymer is then compounded with the desired quantities of sulfur ranging from 1% to 3 or 4% or even higher together with a sulfurization aid such as Tuads (tetramethyl thiuram disulfide) and any desired pigments or other addition substances and the desired second polymer is then mixed in on the mill. This second polymer is preferably an ethylene polymer, or an interpolymer of ethylene with other polymerizable substances as produced by the high pressure, high temperature polymerization process disclosed for example in U. S. Patent No. 2,153,553 issued April 11, 1939, to Fawcett et al., or British Patent No. 471,590 also issued to Fawcett et al., or it may be an interpolymer of ethylene with other unsaturates as shown in British Patent No. 497,643. These polymers are prepared by compressing the ethylene to pressures ranging from 100 to 2500 atmospheres, preferably in the presence of a catalyst such as oxygen in the proportion of approximately 0.1%, with or without the presence of other polymerizable substances such as vinyl chloride, isobutylene, pentene-2, butadiene, styrene, methyl methacrylate and other substances indicated in the last mentioned British patent. The resulting polymers, especially the high pressure simple polymers of ethylene, are solid, slightly waxy substances which are highly inert chemically, have a low iodine number, usually well below 5, are non-reactive with sulfur, and are moderately plastic, tough and flexible.

The mixture of these two different types of resins as prepared on the mill may then be cured in a mold or other convenient manner at a temperature ranging from 135° C. to 175° C., the preferred temperature being 155° C. for a time ranging from 15 minutes to 90 minutes, depending somewhat on the size of the mold and the character and quality of the respective polymers. The proportion of the respective polymers may vary from 99 parts of isoolefin-diolefin interpolymer with 1 part of polyethylene to 5 parts of interpolymer with 95 parts of polyethylene.

The resulting polymer shows an elastic limit, with a good tensile strength at the elastic limit, the tensile strength depending to some extent upon the proportion of polyethylene incorporated in the mixture and at the same time the mixture shows a high elasticity ranging from 900 to 1200%, a good abrasion resistance, a good flexure resistance, and a tensile strength ranging from 4200 pounds in the lower proportions of polyethylene to a tensile strength of 2,000 pounds or above in the higher proportions of polyethylene.

Another important advantage of such mixtures lies in the greater ease of working on the mill which is obtained by the incorporation of the polyethylene or interpolymers of ethylene. The isoolefin-diolefin interpolymers are relatively non-plastic on the mill, and they do not show the properties of softening and breakdown on the mill which are characteristic of rubber, and when such breakdown of the interpolymer is obtained, as by prolonged milling, the physical characteristics of the polymer are harmed and also the curing properties are injuriously modified. This "nervy" characteristic of the isoolefin-diolefin interpolymers makes them difficult to process on the ordinary processing equipment, especially such equipment as the extruders and calendars. The addition of small amounts, preferably on the order of from 1% to 3%, of the ethylene polymer greatly improves the working of the material during processing, both on the roll mill, on the calender and in the extruder, without any harmful effect upon the physical properties such as tensile strength, elongation, abrasion resistance and flexure resistance of the cured material, and at the same time a substantial and valuable reduction in tackiness and a marked increase in the resistance of the cured material to solvents generally is obtained.

*Example 1*

An olefinic mixture consisting of 80 parts of isobutylene, 20 parts of butadiene and 250 parts of liquid ethylene was prepared and polymerized by the application to the surface of the rapidly stirred cold mixture of a spray of a solution of aluminum chloride in methyl chloride, the catalyst solution containing approximately 1% of dissolved aluminum chloride. The catalyst solution is preferably precooled to approximately the temperature of the olefinic mixture. When approximately 60% of the olefinic mixture had polymerized, the reaction was quenched by the addition of 35 parts of isopropyl alcohol. The solid polymer was then removed from the reaction chamber, brought up to room temperature, and washed with water to remove the isopropyl alcohol and the residual traces of the aluminum chloride and its decomposition products. This material was found to have an iodine number of approximately 7 and a molecular weight of approximately 60,000. This interpolymer was then compounded according to the following formula:

| | Parts |
|---|---|
| Isobutylene-butadiene interpolymer | 100 |
| Sulfur | 3 |
| Stearic acid | 3 |
| Zinc oxide | 5 |
| Tuads (tetramethyl thiuram disulfide) | 1 |

This material was prepared by placing the interpolymer on a double roll mill, working it for about 5 minutes until it was warmed up somewhat, then adding the several compounding substances, the Tuads being added last after the mill had been cooled somewhat in order to avoid a premature cure.

(This material is susceptible of a cure as above compounded, and when cured at 155° C. for 30 minutes it showed an elastic limit, a tensile strength at the elastic limit of 2000 pounds per square inch and an elongation of 1100%.)

The interpolymer as above compounded was then mixed with 20 parts of polyethylene known in the trade as "Polythene." This material was compounded and the material prepared according to the above formula, then working on the same mill at a temperature of approximately 120° C., care being exercised to keep the temperature below 135° C., at which the cure begins in the presence of the Tuads. This material was then put in the mold and cured at a temperature of 155° C. for a time of 30 minutes, and the mixture was found to have a tensile strength of 2500 pounds per square inch, and an elastic limit of 1200%.

*Example 2*

The material according to the above formula was compounded with 3 parts of polyethylene and cured as before. The resulting cured material was free from tackiness and had a wax-like feel and a good tensile strength and elongation, showing that even small proportions of the polyethylene are capable of imparting to the material the desired waxy surface character, even when present in very small proportions.

*Example 3*

A similar mixture was prepared and 50 parts of polyethylene were added and the mixture cured as before. This preparation also showed a good tensile strength and a good elongation and a particularly high resistance to hydrocarbon solvents as well as the waxy surface character previously obtained.

*Example 4*

A portion of the above mixture containing approximately 5 parts of the interpolymer was mixed with approximately 95 parts of the polyethylene, as before, and cured in a similar manner. Even this mixture showed a definite elastic limit, a substantial tensile strength and a good elongation, showing that even small amounts of the curable interpolymer will produce an elastic limit and a good tensile strength in the compounded material.

The above examples present what may be called a "pure gum" composition since the amount of pigment and filler present is relatively very small. The character of the compound may be still further improved by the addition of various fillers and pigments such as carbon black, clay, lithopone, barytes, zinc oxide and many other substances.

*Example 5*

The isobutylene-butadiene interpolymer compounded as indicated in Example 1 was mixed with approximately 10 parts of the interpolymer of ethylene and vinyl chloride prepared as taught in British Patent No. 497,643. The resulting mixture was then cured in the same manner as in Example 1, and was found to have similar characteristics of high tensile strength, good elongation, good flexure resistance and good abrasion resistance as is characteristic of the cured isobutylene, butadiene interpolymer, and in addition the solvent resistance is markedly increased, a waxy characteristic given to the surface, and the surface tackiness removed.

The other ethylene interpolymers taught by British Patent No. 497,643 are similarly useful. All these interpolymers, including the interpolymer of ethylene and isobutylene, the interpolymer of butadiene and ethylene, the interpolymer of ethylene and styrene, the interpolymer of ethylene, styrene and methyl methacrylate, the interpolymer of ethylene and pentene-2, the interpolymer of ethylene and pentene-2, the interpolymer of ethylene and stilbene, the interpolymer of ethylene and limonene and the other interpolymers taught in the British patent are similarly useful in the preparation of these mixtures of iso-olefinic-diolefinic polymers with poly ethylene containing interpolymers.

Thus there is produced according to this invention new compositions of matter in which the solvent resistance of an interpolymer of isobutylene and a diolefin is greatly increased and the surface character converted from a tacky nature into a waxy nature, and still retains a high tensile strength and a satisfactory elongation.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A composition of matter comprising in combination a low-temperature olefin-diolefin interpolymer, characterized by a molecular weight within the range of 15,000 to 150,000, an iodine number within the range of 1 to 50 and reactivity with sulfur, in the proportion of 5% to 99%; together with polyethylene in the proportion of 95% to 1%, sulfur in the proportion of 1% to 5% and small, significant quantities of zinc oxide, stearic acid and an organic sulfide.

2. A composition of matter comprising in combination a low-temperature olefin-diolefin interpolymer, characterized by a molecular weight within the range of 15,000 to 150,000, an iodine number within the range of 1 to 50 and reactivity with sulfur, in the proportion of 5% to 99%, together with polyethylene in the proportion of 95% to 1%, and sulfur in the proportion of 1% to 5%.

3. A composition of matter comprising in combination a low-temperature olefin-diolefin interpolymer, characterized by a molecular weight within the range of 15,000 to 150,000, an iodine number within the range of 1 to 50 and reactivity with sulfur in the proportion of 5% to 99%; together with polyethylene in the proportion of 95% to 1% and combined sulfur in the proportion of 1% to 5% and tetra methyl thiuram disulfide in the proportion of approximately one part, the said composition being characterized by a definite tensile strength; and an elongation at break ranging from 900% to 1200%.

4. A composition of matter comprising in combination a low-temperature olefin-diolefin interpolymer, characterized by a molecular weight within the range of 15,000 to 150,000, an iodine number within the range of 1 to 50 and reactivity with sulfur; together with polyethylene and combined sulfur, the said mixture being characterized by a tensile strength within the range of 2,000 to 4200 lbs. per square inch; and an elongation at break ranging between 900% and 1200%, substantially complete chemical saturation and a waxy, non-tacky surface.

5. A composition of matter, comprising in combination a low-temperature isobutylene-conjugated diolefin interpolymer, characterized by a molecular weight within the range of 15,000 to 150,000, an iodine number within the range of 1 to 50 and reactivity with sulfur in the proportion of 5% to 99%; together with polyethylene in the proportion of 95% to 1% and sulfur in the proportion of 1% to 5%.

6. A composition of matter comprising in combination a low-temperature isobutylene-butadiene interpolymer, characterized by a molecular weight within the range of 15,000 to 150,000, an iodine number within the range of 1 to 50 and reactivity with sulfur in the proportion of 5% to 99%; together with polyethylene in the proportion of 95% to 1% and sulfur in the proportion of 1% to 5%.

7. A composition of matter comprising in combination a low-temperature isobutylene-isoprene interpolymer, characterized by a molecular weight within the range of 15,000 to 150,000, an iodine number within the range of 1 to 50 and reactivity with sulfur in the proportion of 5% to 99%; together with polyethylene in the proportion of 95% to 1% and sulfur in the proportion of 1% to 5%.

8. A composition of matter comprising in combination a low-temperature isobutylene-piperylene interpolymer, characterized by a molecular weight within the range of 15,000 to 150,000, an iodine number within the range of 1 to 50 and reactivity with sulfur in the proportion of 5% to 99%; together with polyethylene in the proportion of 95% to 1% and sulfur in the proportion of 1% to 5%.

NATHAN S. BEEKLEY, Jr.